United States Patent [19]

Frey

[11] 4,019,047

[45] Apr. 19, 1977

[54] TROUBLE LAMP FOR MECHANICS

[76] Inventor: Oscar J. Frey, 8660 - 46th SW., Seattle, Wash. 98136

[22] Filed: Nov. 17, 1975

[21] Appl. No.: 632,640

[52] U.S. Cl. .......................... 240/54 A; 248/206 A

[51] Int. Cl.² .................... F21V 15/00; F16B 47/00

[58] Field of Search ........ 240/51.11 R, 54 R, 54 A, 240/52.15, 102 R, 102 A, 102 B; 269/8, 75; 248/206 A; 354/126

[56] References Cited

UNITED STATES PATENTS

| | | | |
|---|---|---|---|
| 1,405,221 | 1/1922 | Jenkins | 248/206 A X |
| 1,932,143 | 10/1933 | Piercy | 240/52.15 |
| 2,506,400 | 5/1950 | Wietz | 248/206 A |
| 2,747,079 | 5/1956 | Kubiliunas | 240/54 A X |
| 2,861,501 | 11/1958 | Strelakos | 248/206 A X |
| 3,584,213 | 6/1971 | Meltzer | 240/54 A |
| 3,688,662 | 9/1972 | Smith | 354/126 |

*Primary Examiner*—Donald A. Griffin

[57] ABSTRACT

A trouble lamp cage is disclosed to include a magnet for attaching the device to ferrous matter so that relative rotation of the lamp about its axis vis-a-vis the magnet is permitted.

6 Claims, 5 Drawing Figures

TROUBLE LAMP FOR MECHANICS

BRIEF SUMMARY OF THE INVENTION:

It is well known to employ magnetic means to attach or securely mount shielded trouble lamps for mechanics relative engines or other mechanisms. A primary problem with the prior devices has been that when they are in place, disposition of the light shield to preclude light passing to the mechanic's eyes has been difficult, even if possible. Where the magnet is a clamp attached to the lamp socket, the clamp must be loosened, the socket rotated, and the clamp retightened. Where the magnet has been attached directly to the cage, either the reflective means must be movable within the cage or a location for attaching the magnet must be found at a place where the shielding means is disposed between the lamp and the mechanic's eyes. Where a magnet has been mounted to permit rotation at the end of the bulb cage, some means has had to be added to prevent undesirable rotation as may occur when the lamp cord is arranged out of the way or moved. It has been a primary object of this invention in overcoming the difficulties of the prior known devices to provide a relatively rotatable relationship between the magnet and the cage at its mid-point whereby to provide a balanced attachment of the trouble lamp, easy adjustment of the shielding means, and an arrangement of parts not easily capable of becoming maladjusted. Other objects and advantages of the invention will become apparent during the course of a study of the following detailed disclosure.

DETAILED DESCRIPTION OF THE INVENTION

Figure 1:
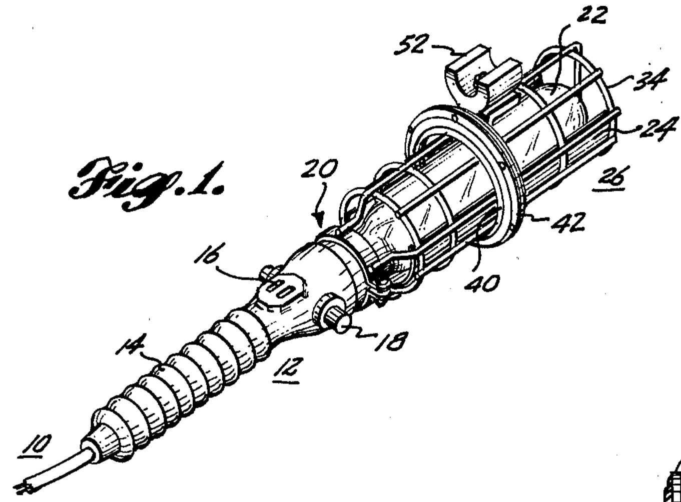
FIG. 1 is a perspective view of a trouble lamp incorporating this invention.
Figure 3:
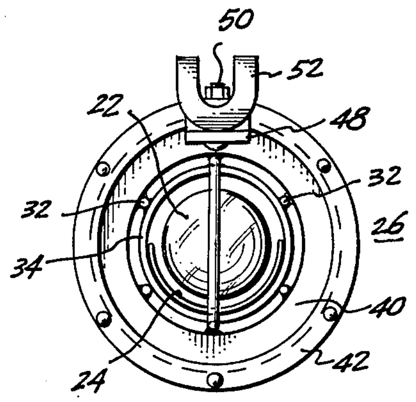
FIG. 3 is an end view of the protective cage of the lamp.
Figure 2:
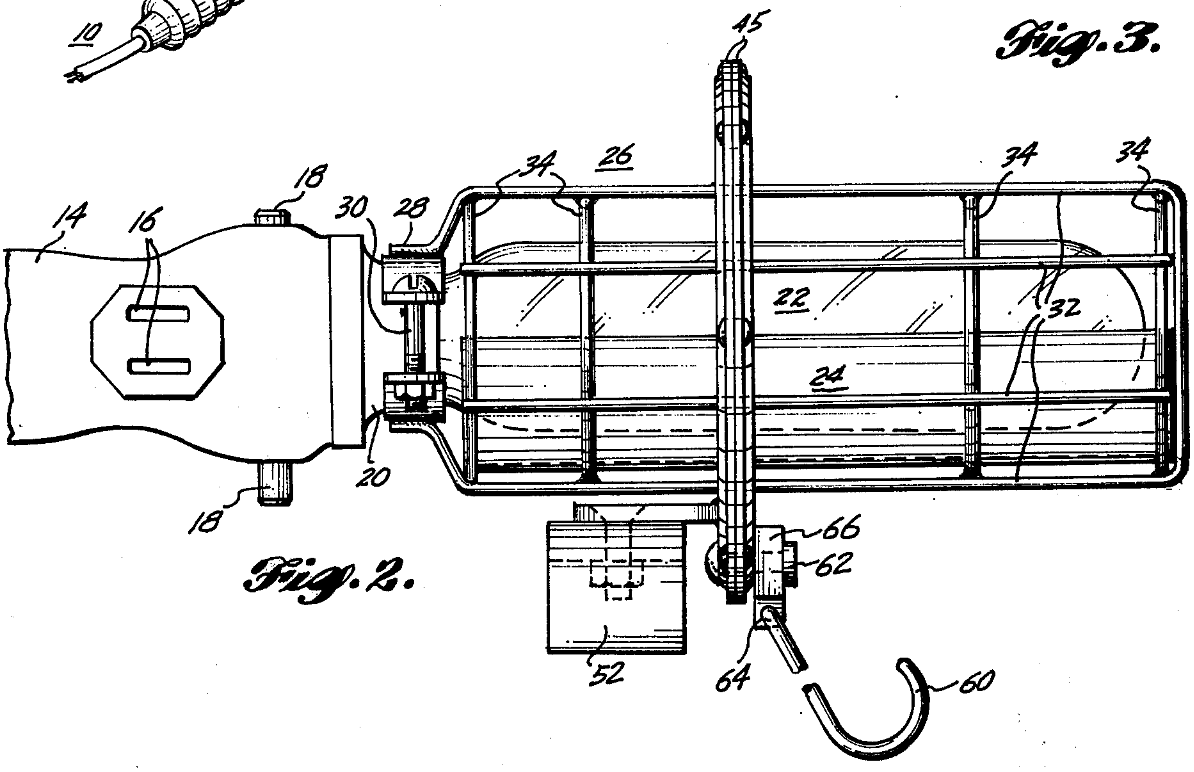
FIG. 2 is an enlarged view in side elevation showing details of the trouble lamp of FIG. 1.

The trouble lamp of FIG. 1 is located at an end of cord 10. Handle body 12 includes handle extension 14, the auxiliary plug-in outlet 16, switch means 18 embedded therein, and lamp socket 20.

Lamp bulb 22 is screwed secure in socket 20 and is enclosed within the protective cage 26. Preferably bulb 22 is of the well known type commonly used for showcase illumination. The illustrated bulb is elongated rather than bulbous or pear-shaped. Light shield means is provided within the protective cage to preclude emanation of light rays outward from the bulb 22 for about one-half of its radiation capability. Light shielding may be accomplished in two ways. Showcase bulbs 22 of the type described are available with one-half their surface being shielded with either an internally or an externally applied reflective material, such as silver. Alternatively, a hollow, semi-cylindrical light shield 24 may be mounted within the cage 26, the same being secured to longitudinal bars 32 thereof at appropriate contact places.

Cage 26 has at one end an attaching clamp 28 which encircles the hub of the socket 20 and is tightened thereabout by screw 30. Plural, longitudinal bars 32 extend outward from the clamp 28 and are joined together by rings 34 to provide a strong and rigid openwork protective cage about the bulb 22.

While the cage shown here is cylindrical and designed to surround an elongated display bulb 22, it will be clear and, of course obvious to those skilled in the art that when it is desired to use pear-shaped or bulbous-shaped lamp bulbs, the shape of the cage and its dimensions and light shielding will be varied appropriately.

Figure 4:
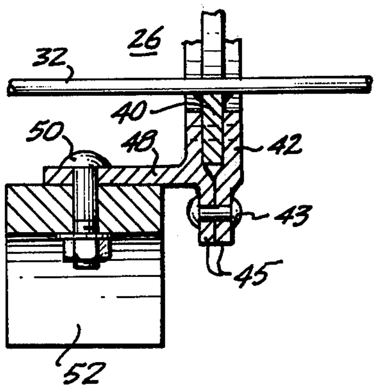
FIG. 4 is a fragmentary view in partial cross-section showing one form of rotatable means employed between the protective cage and a mounting/positioning magnet.

In the preferred form of this invention shown in FIG. 4, an open-centered discoidal member 40 encircles and is secured about cage 26 in the mid-portion of its longitudinal dimension. Member 40 stands outward in the manner of an encircling flange.

Annular member 42 is channel-shaped in cross-section as shown in FIG. 4. The channel 42 straddles or encases the discoidal member 40. Channel 42 and disc 40 are relatively rotatable. The channel-shaped member 42 is formed of a pair of similar annular stampings, having peripheral flanges 45 secured together by rivets or other fasteners 43. At one location in the circumference of channel member 42 is an arm 48 disposed somewhat parallel to a cage 26 in outward spaced relation. By means of bolt 50 passing through arm 48, the U-shaped or horseshoe-shaped magnet 52 is attached to the arm and hence to the rotatable structure comprising channel 42 and disc 40.

Figure 5:
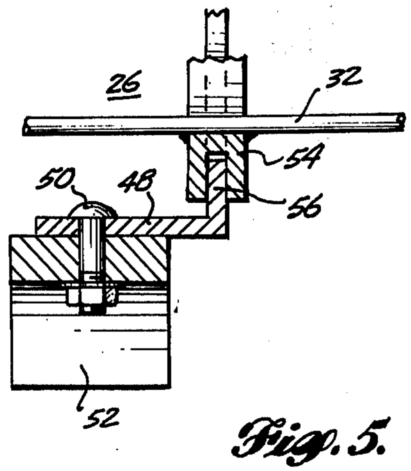
FIG. 5 illustrates an alternate mounting/positioning assembly.

In FIG. 5 is shown an alternative assembly in which the outwardly open, annular channel member 54 is secured in encircling relation about cage 26 by being attached to bars 32. Disc 56 is disposed within the groove of channel member 54. In this instance the arm 48 is attached to the disc 56 and is otherwise disposed as above described, and supports the magnet 52 by means of the bolt 50.

In either of these two forms the outermost encircling member may be magnetically attached or mounted relative ferrous matter such as iron and steel usually found in connection with internal combustion engines, electric motors, pumps and the like. When such a magnet is secured in place, it fixedly supports either the channel 42 (FIG. 4) or the disc 56 (FIG. 5) in a position by the user. He then is free to rotate the protective cage and the bulb therewithin to dispose the light shield so that it directs light only toward his chosen work area and precludes direct light enanations into his eyes.

A hanger hook 60 is attached to pin 62 by being pivotally connected at 64 to the collar 66. Hook 60 comprises an auxiliary mounting means whereby the protective cage journaled in the encircling disc and channel assembly may be suspended as desired without resort to the magnet 52.

In compliance with the statute, the invention has been described in language more or less specific as to structural features. It is to be understood, however, that the invention is not limited to the specific features shown, since the means and construction herein disposed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. In a trouble-lamp of the type wherein a light bulb is mounted in a socket at an end of an extension cord and a protective openwork cage, non-rotatably attached to the socket, surrounds said light bulb, and light shield means is provided within said cage to preclude light emanations along one side of said light bulb, the improvement comprising:
  an open-centered discoidal member;
  an annular member, channel-shaped in cross-section rotatably interfitted to an edge of said discoidal member to permit relative rotation about a common axis of one member with respect to the other member;
  one of said members being fixedly secured intermediate of the length of said protective cage; and
  the other of said members being fixedly secured to a magnet for mounting on magnetically attractive means proximate to a work area to be illuminated.

2. The structure according to claim 1 in which said annular member encircles and rotates about the outer edge of said discoidal member.

3. The structure according to claim 2 in which the discoidal member encircles and is non-rotatably secured to said protective cage in its mid-section and said magnet is attached to said annular member.

4. The structure according to claim 1 in which the annular member is encircled by said discoidal member.

5. The structure according to claim 4 in which said annular member encircles and is non-rotatably secured to said protective cage in its mid-section and said magnet is attached to said discoidal member.

6. An electrical trouble-lamp of the common type used by mechanics and craftsmen, comprising:
  an extension cord having a socketed light bulb at one operating end;
  an openwork protective cage non-rotatably secured to the bulb socket and extending therefrom in relation to said bulb;
  light shield means within said cage located to preclude light emanations along one side of said bulb;
  a first annular member secured to and encircling said cage;
  a second annular member rotatably coupled with said first annular member whereby said cage, socketed light bulb and light shield means may be rotated coaxial of said members; and
  a magnet secured to the periphery of said second annular member for attachment to magnetically attractive means proximate to a work area to be illuminated.

* * * * *